(12) United States Patent
Marur

(10) Patent No.: US 7,762,567 B2
(45) Date of Patent: Jul. 27, 2010

(54) STEERING SYSTEM AND METHOD FOR STEERING A VEHICLE

(75) Inventor: Prabhakar Marur, Bangalore (IN)

(73) Assignee: GM Global Technology Operations, Inc., Detroit, MI (US)

( * ) Notice: Subject to any disclaimer, the term of this patent is extended or adjusted under 35 U.S.C. 154(b) by 174 days.

(21) Appl. No.: 12/178,687

(22) Filed: Jul. 24, 2008

(65) Prior Publication Data

US 2010/0018797 A1   Jan. 28, 2010

(51) Int. Cl.
  *B62D 7/00* (2006.01)
  *B62D 15/00* (2006.01)
(52) U.S. Cl. ............ 280/93.5; 280/93.502; 701/41
(58) Field of Classification Search ......... 280/93.5, 280/93.502, 93.511, 93.512; 701/41, 45; 188/17, 18 R, 26; 403/119, 161, 162, 163
See application file for complete search history.

(56) References Cited

U.S. PATENT DOCUMENTS

| | | | | |
|---|---|---|---|---|
| 3,635,304 A | * | 1/1972 | Hills | 180/400 |
| 3,961,804 A | * | 6/1976 | Blanton | 280/89.11 |
| 4,697,817 A | * | 10/1987 | Jefferson | 280/89.12 |
| 4,854,112 A | * | 8/1989 | Holley et al. | 56/6 |
| 6,302,421 B1 | * | 10/2001 | Lee | 280/210 |
| 6,659,475 B2 | | 12/2003 | Clements et al. | |
| 6,668,965 B2 | * | 12/2003 | Strong | 180/411 |
| 7,527,294 B2 | * | 5/2009 | Porter et al. | 280/777 |
| 2006/0267329 A1 | * | 11/2006 | Porter et al. | 280/777 |
| 2009/0243245 A1 | * | 10/2009 | Hayakawa et al. | 280/93.5 |

* cited by examiner

*Primary Examiner*—Paul N. Dickson
*Assistant Examiner*—Joseph Rocca
(74) *Attorney, Agent, or Firm*—Quinn Law Group, PLLC

(57) ABSTRACT

A steering system disengages a wheel assembly of a vehicle in response to an event while driving. The steering system includes a suspension knuckle, a tie rod, and a puller. The puller includes a connector that removably engages the suspension knuckle and the tie rod to interconnect the suspension knuckle and the tie rod. The puller is operable to move the connector to disconnect the connector from at least one of the suspension knuckle and the tie rod in response to the event. The vehicle is operated along a longitudinal axis while driving and a moment of the vehicle about the longitudinal axis is sensed. If the moment exceeds the threshold, the puller is energized to disconnect the suspension knuckle from the tie rod.

19 Claims, 2 Drawing Sheets

STEERING SYSTEM AND METHOD FOR STEERING A VEHICLE

TECHNICAL FIELD

The present invention relates to a system for disengaging a wheel assembly of a vehicle and a method of doing the same.

BACKGROUND OF THE INVENTION

A typical vehicle includes a steering system having a steering mechanism, a pair of tie rods, and a pair of suspension knuckles. The steering mechanism includes a body and a rack that extends through the body to opposing ends. The rack is movable with respect to body. One of the tie rods are pivotally attached to a selective end of the rack. Each of the tie rods extend from the end of the rack to a tie joint. A suspension knuckle is pivotally attached to a selective tie joint. Each suspension knuckle is attached to a wheel assembly. Each suspension knuckle turns the respective wheel assembly in response to the rack moving with respect to the body of the steering assembly to steer the vehicle.

Each suspension knuckle includes a support member which is adapted to support one of the wheel assemblies. An upper and a lower support arm extend from the support member. A steering arm extends from the support member to a steering joint. The tie joint of the tie rod is connected to the steering joint of the steering arm to turn the wheel assemblies and steer the vehicle. An upper control arm is pivotally connected to the upper support arm and a lower control arm is pivotally connected to the lower support arm. The upper and lower control arms are also pivotally connected to a chassis of the vehicle. The pivotal connections between the upper and lower control arms and the respective suspension knuckles and the chassis allow the wheel assemblies to move up and down, relative to the chassis, while driving the vehicle.

SUMMARY OF THE INVENTION

A steering system for a vehicle includes a suspension knuckle and a tie rod. A puller has a connector for engaging each of the suspension knuckle and the tie rod to interconnect the suspension knuckle and the tie rod when the connector is in an extended position. The connector is movable to a retracted position to disconnect the connector from at least one of the suspension knuckle and the tie rod in response to an event.

A steering system for steering a vehicle while driving the vehicle includes a first and a second suspension knuckle and a steering mechanism. A first tie rod, for turning the first suspension knuckle, is disposed between the steering mechanism and the first suspension knuckle. A second tie rod, for turning the second suspension knuckle, is disposed between the steering mechanism and the second suspension knuckle. A first puller is configured for engaging the first suspension knuckle and the first tie rod to interconnect the first suspension knuckle and the first tie rod when the first puller is in a de-energized position. A second puller is configured for engaging the second suspension knuckle and the second tie rod to interconnect the second suspension knuckle and the second tie rod when the second puller is in a de-energized position. At least one of the pullers is movable from the de-energized position to an energized position in response to an event while driving the vehicle such that at least one of the pullers disconnects the suspension knuckle from the respective tie rod.

A method of controlling a vehicle in response to an event while driving the vehicle includes operating the vehicle along a longitudinal axis while driving the vehicle. A moment of the vehicle about the longitudinal axis is sensed. One of a first and a second suspension knuckle is disconnected from a respective one of a first and second tie rod when the moment of the vehicle about the longitudinal axis is sensed to exceed a threshold.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
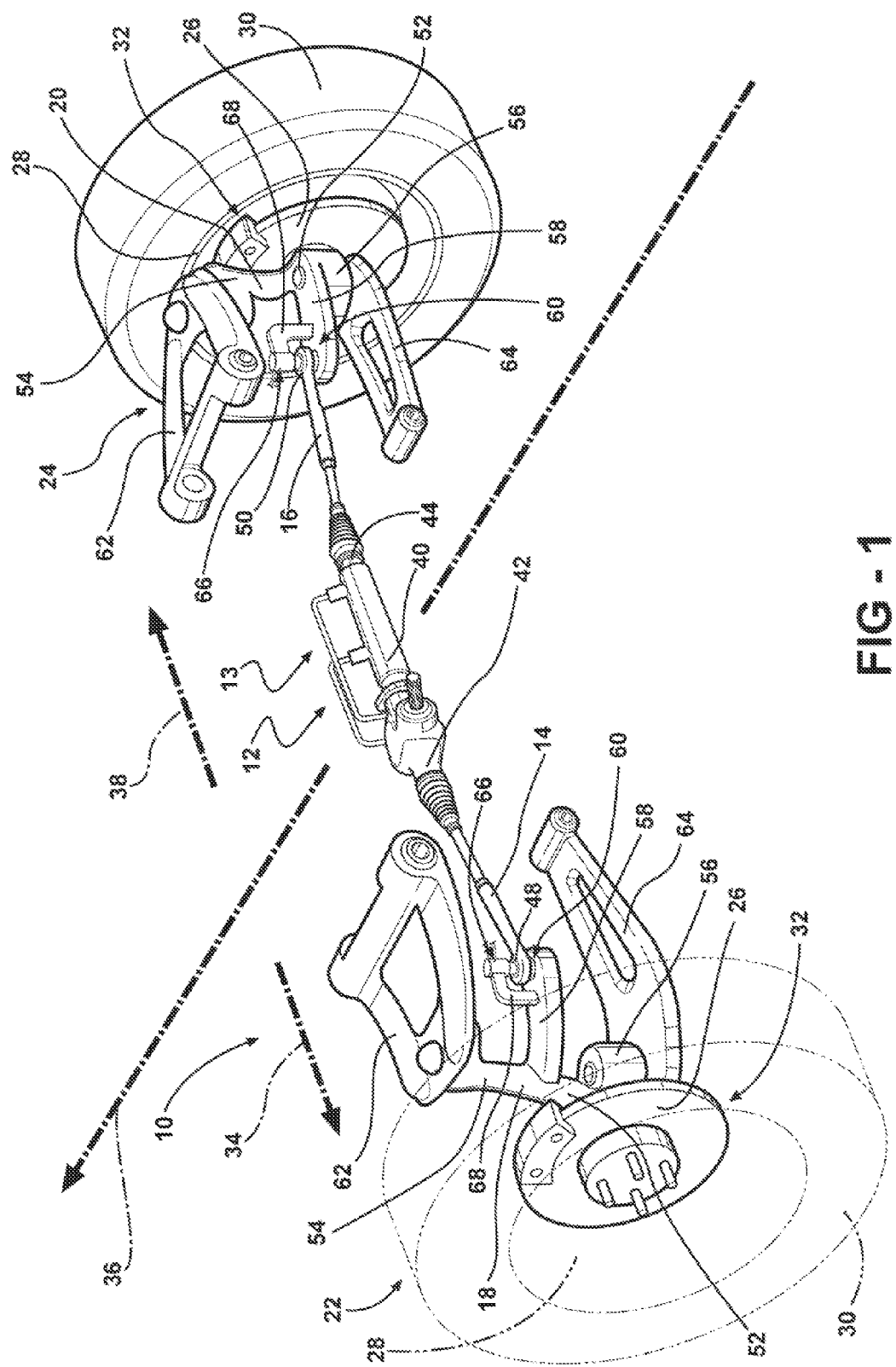
FIG. 1 is a perspective view of a steering system for a vehicle having pullers for removably connecting tie rods to suspension knuckles.

Referring to the drawings, wherein like reference numbers refer to like components, FIG. 1 shows a steering system 10 for steering a vehicle. The steering system 10 includes a steering assembly 12 and a first and second wheel assembly 22, 24.

The steering assembly 12 includes a steering mechanism 13 having a body 40 that extends between a first end 42 opposing a second end 44. The steering assembly 12 also includes a rack (not shown) that extends through the body 40 between the opposing ends 42, 44. The rack is movable back and forth within the body 40. The steering assembly 12 also includes a first tie rod 14 that extends from the first end 42 and a second tie rod 16 that extends from the second end 44. One of the tie rods 14, 16 is pivotally attached to a respective end 42, 44 of the rack of the mechanism 13. The tie rods 14, 16 extend from the steering mechanism 13 in opposing directions, as shown in FIG. 1. The first tie rod 14 extends from the steering mechanism 13 to a first tie joint 48 and the second tie rod 16 extends from the steering mechanism 13 to a second tie joint 50.

The wheel assemblies 22, 24 include a first and a second suspension knuckle 18, 20. As will be described in more detail below, the first tie joint 48 is operatively connected to the first suspension knuckle 18 and the second tie joint 50 is operatively connected to the second suspension knuckle 20. Each wheel assembly 22, 24 also includes a rotor 26, a wheel 28, a tire 30, a brake assembly 32, and the like. However, the wheel assemblies 22, 24 may have more or less components as known to those skilled in the art.

The steering assembly 12 is operatively connected to a steering wheel (not shown). Turning the steering wheel moves the rack back and forth relative to the body 40 such that the wheel assemblies 22, 24 of the vehicle turn in response to rotating the steering wheel. Therefore, referring to FIG. 1, when the steering wheel is turned in a first direction 34, i.e., toward the left of the vehicle, both of the wheel assemblies 22, 24 also turn toward the left of the vehicle to turn the vehicle to the left as the vehicle is driving along a longitudinal axis 36. Conversely, when the steering wheel is turned in a second direction 38, i.e., toward the right of the vehicle, the wheel assemblies 22, 24 also turn toward the right of the vehicle to turn the vehicle to the right as the vehicle is driving along the longitudinal axis 36.

Each of the suspension knuckles 18, 20 include a support member 52 which is adapted to support the wheel 28 assembly. In one embodiment, an upper and a lower support arm 54, 56 extend from the support member 52 in spaced relationship to one another. A steering arm 58 extends from the support member 52, between the support arms 54, 56. The steering arm 58 extends to a steering joint 60. The tie joint 48, 50 of the respective tie rod 14, 16 is disposed over, and is connected to, the steering joint 60 of the steering arm 58. The connection between each of the tie joints 48, 50 and the respective steering joint 60 allows the wheel assemblies 22, 24 to turn in the first direction 34, toward the left, or in the second direction 38, toward the right, relative to the longitudinal axis 36, to steer the vehicle in response to moving the tie rods 14, 16 back and forth. It should be appreciated, however, that suspension knuckles 18, 20 having other configurations known to those skilled in the art may also be used.

An upper control arm 62 is pivotally connected to each of the upper support arms 54 and a lower control arm 64 is pivotally connected to each of the lower support arms 56, as shown in FIG. 1. The upper and lower control arms 62, 64 are also pivotally connected to a chassis (not shown) of the vehicle. The pivotal connections between the upper and lower control arms 62, 64, the respective first and second suspension knuckles 18, 20, and the chassis allows each wheel assembly 22, 24 to move up and down, relative to the chassis, while driving the vehicle.

Figure 2:
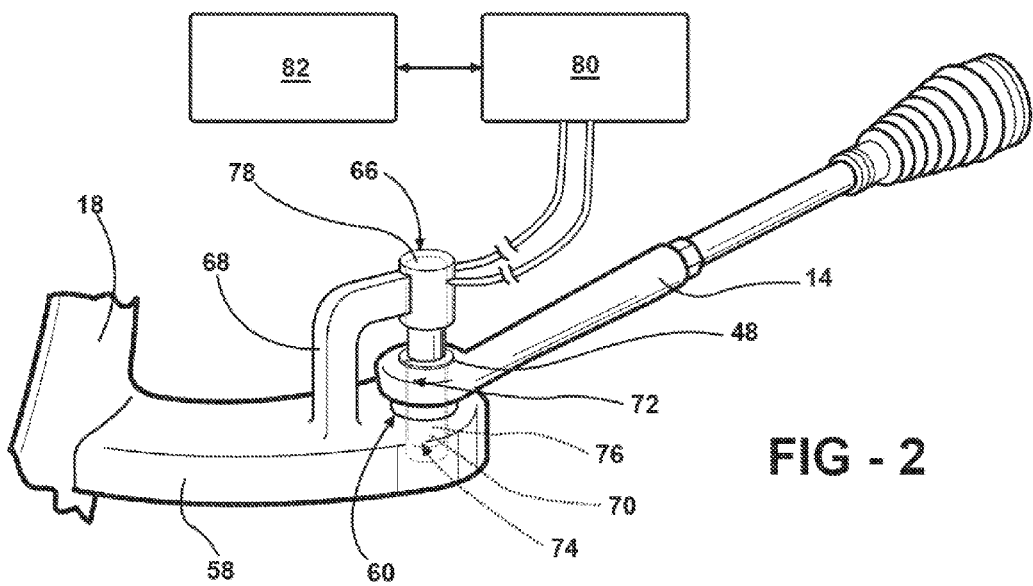
FIG. 2 is a partial schematic perspective view of the puller in a de-energized position interconnecting a steering arm of one of the suspension knuckles to a tie joint of one of the tie rods.
Figure 3:
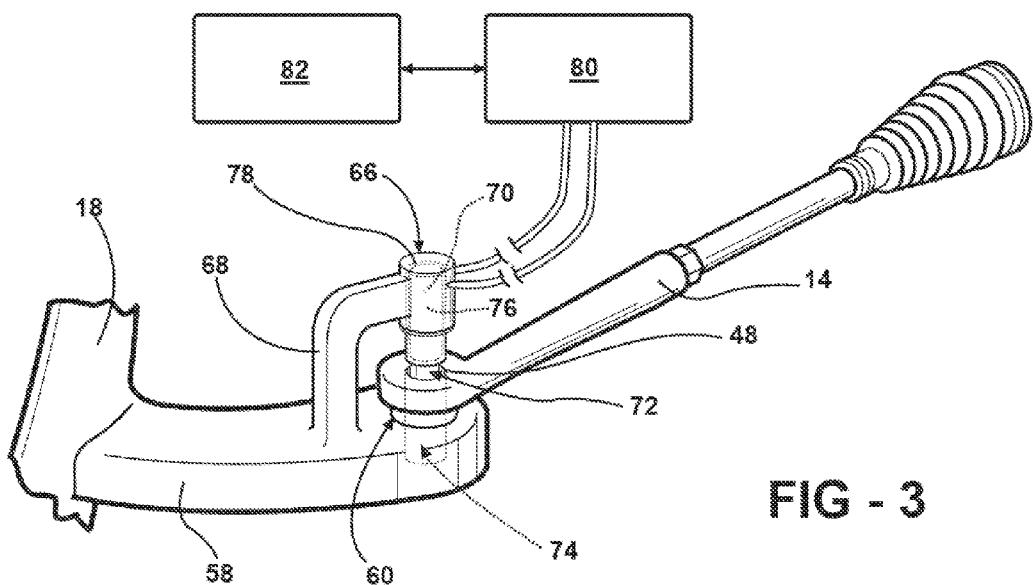
FIG. 3 is a partial schematic perspective view of the puller of FIG. 2 in an energized position disconnecting the steering arm from the tie joint.

Referring to FIGS. 1-3, a puller 66 operatively connects the tie joint 48, 50 of the tie rod 14, 16 to the steering joint 60 of the steering arm 58. The puller 66 is movable between a de-energized position, as shown in FIG. 2, and an energized position, as shown in FIG. 3. In the de-energized position, the puller 66 interconnects the tie joint 48, 50 of the tie rod 14, 16 and the steering joint 60 of the steering arm 58. In the energized position, the puller 66 is moved to disconnect the tie joint 48, 50 from steering joint 60. A bracket 68 may extend from the puller 66 and connect the puller 66 to the respective suspension knuckle 18, 20. It should be appreciated, however, that the puller 66 is not limited to extending from the suspension knuckles 18, 20, but may extend from any other component of the vehicle as known to those skilled in the art.

Referring to FIGS. 2 and 3, the puller 66 includes a connector 70. The connector 70 may be a pin 76 that is movable linearly between an extended position, corresponding to the de-energized position shown in FIG. 2, and a retracted position, corresponding to the energized position shown in FIG. 3. In one embodiment, the tie joint 48, 50 defines a first hole 72 and the steering joint 60 defines a second hole 74 and the holes 72, 74 are aligned. The connector 70 extends through the first and second holes 72, 74 to interconnect the tie joint 48, 50 of the tie rod 14, 16 and the steering joint 60 of the steering arm 58 when the puller 66 is in the de-energized position, i.e., the extended position. Likewise, the connector 70 is removed from the first and second holes 72, 74 to disconnect the tie joint 48, 50 of the tie rod 14, 16 and the steering joint 60 of the steering arm 58 when the puller 66 is in the energized position, i.e., retracted position. It should be appreciated that the invention is not limited to having holes 72, 74 defined in each of the tie joint 48, 50 and the steering joint 60 as other configurations for connecting the tie rod 14, 16 to the steering arm 58 may be used as known to those skilled in the art.

Referring again to FIGS. 2 and 3, the puller 66 also includes an actuator 78 that moves the connector 70 in response to the application of a signal to disconnect one of the tie rods 14, 16, from the respective suspension knuckle 18, 20. In one embodiment, the actuator 78 is electromagnetic. It should be appreciated, however, that the actuator 78 is not limited to being electromagnetic, but may be any type of actuator 78 known to those skilled in the art for moving the connector 70 in response to the signal to disconnect the tie rod 14, 16 from the respective suspension knuckle 18, 20. This means that in the presence of the signal, the actuator 78 moves the connector 70 from the extended position to the retracted position to disconnect the tie rod 14, 16 from the respective suspension knuckle 18, 20. In one embodiment, the vehicle includes a controller 80. The controller 80 is operatively connected to each of the actuators 78 and the controller 80 sends the signal to the actuator 78 of the puller 66. In response to the signal, the actuator 78 is energized to move the connector 70 to the retracted position and disconnect the tie joint 48, 50 of the tie rod 14, 16 from the steering joint 60 of the steering arm 58.

At least one sensor 82 may be disposed in the vehicle. The sensor 82, which is operatively connected to the controller 80, is for sensing a moment of the vehicle about the longitudinal axis 36 as the vehicle is driving along the longitudinal axis 36. As the vehicle is driving along the longitudinal axis 36, the vehicle may experience an event that results in a moment about the longitudinal axis 36. The sensor 82 communicates the moment of the vehicle about the longitudinal axis 36 to the controller 80. The controller 80 determines a direction of the moment of the vehicle about the longitudinal axis 36 as being either a first direction 34 of the moment, i.e., toward the left of the vehicle, or a second direction 38 of the moment of inertia, i.e., toward the right of the vehicle, opposite the first direction 34 of the moment of inertia. When the controller 80 determines from the sensor 82 that the direction of the moment is in the first direction 34 about the longitudinal axis 36 and is above a threshold amount or value, the controller 80 sends the signal to the first puller 66 to disconnect the first suspension knuckle 18 from the first tie rod 14 to reduce the moment of the vehicle about the longitudinal axis 36. Likewise, when the sensor 82 senses that the direction of the moment is in the second direction 38 about the longitudinal axis 36 and is above the threshold amount, the controller 80 sends the signal to the second puller 66 to disconnect the second suspension knuckle 20 from the first tie rod 14 to reduce the moment of the vehicle about the longitudinal axis 36.

While the best modes for carrying out the invention have been described in detail, those familiar with the art to which this invention relates will recognize various alternative designs and embodiments for practicing the invention within the scope of the appended claims.

The invention claimed is:

1. A steering system for a vehicle, said steering system comprising:
   a suspension knuckle;
   a tie rod; and
   a puller having a connector for interconnecting said suspension knuckle and said tie rod when said connector is in an extended position;
   wherein said puller includes an actuator operatively connected to said connector;

wherein said connector is movable to a retracted position to disconnect said connector from at least one of said suspension knuckle and said tie rod in response to an event.

2. A steering system, as set forth in claim 1, wherein said actuator moves said connector to disconnect said connector from said at least one of said suspension knuckle and said tie rod when said actuator is energized in response to the event.

3. A steering system, as set forth in claim 1, wherein said actuator is electromagnetic.

4. A steering system, as set forth in claim 1, wherein said connector moves linearly to disengage said connector from said at least one of said suspension knuckle and said tie rod.

5. A steering system, as set forth in claim 1, wherein said connector is a pin.

6. A steering system, as set forth in claim 1, further comprising a bracket interconnecting said puller and said suspension knuckle.

7. A steering system, as set forth in claim 6, wherein said tie rod is disposed between said puller and said steering arm.

8. A steering system, as set forth in claim 1, wherein said suspension knuckle includes a steering arm and said connector removably engages said steering arm and said tie rod.

9. A steering system, as set forth in claim 8, wherein said tie rod defines a first hole and said steering arm defines a second hole wherein said holes are aligned and said puller extends though said holes to connect said suspension knuckle to said tie rod when said puller is in said extended position and said puller is removed from at least one of said first hole and said second hole when said puller is in said retracted position in response to the event.

10. A steering system, as set forth in claim 9, wherein said tie joint is disposed above said steering arm such that said first hole is disposed above said second hole.

11. A steering system, as set forth in claim 8, wherein said knuckle includes an upper support arm and a lower support arm and wherein said steering arm is disposed between said upper and lower support arms and said upper support arm is pivotally connected to said upper control arm and said lower support arm is pivotally connected to said lower control arm.

12. A steering system, as set forth in claim 11, wherein said puller includes a housing and said pin extends from said housing when said actuator is de-energized and said pin retracts into said housing when said actuator is energized.

13. A steering system for steering a vehicle while driving the vehicle, said steering system comprising:
   a first suspension knuckle;
   a second suspension knuckle;
   a steering mechanism,
   a first tie rod, for turning said first suspension knuckle, disposed between said steering mechanism and said first suspension knuckle,
   a second tie rod, for turning said second suspension knuckle, disposed between said steering mechanism and said second suspension knuckle,
   a first puller for interconnecting said first suspension knuckle and said first tie rod when said first puller is in a de-energized position; and
   a second puller for interconnecting said second suspension knuckle and said second tie rod when said second puller is in a de-energized position;
   wherein at least one of said pullers is movable from said de-energized position to an energized position in response to an event while driving the vehicle such that said at least one of said pullers disconnects said suspension knuckle from said respective tie rod.

14. A steering system, as set forth in claim 13, wherein said puller includes a connector movable between an extended position, corresponding to said de-energized position, and a retracted position, corresponding to said energized position.

15. A steering system, as set forth in claim 14, wherein said pullers are configured such that only one of said pullers moves to said retracted position in response to the event while driving the vehicle.

16. A method of controlling a vehicle in response to an event while driving the vehicle, said method comprising:
   operating the vehicle along a longitudinal axis;
   sensing a moment of the vehicle about the longitudinal axis;
   disconnecting one of a first and a second suspension knuckle from a respective one of a first and a second tie rod when the moment of the vehicle about the longitudinal axis exceeds a threshold.

17. A method, as set forth in claim 16, wherein disconnecting is further defined as energizing a puller to disconnect the one of the first and second suspension knuckles from the respective one of the first and second tie rods when the moment of the vehicle about the longitudinal axis exceeds the threshold.

18. A method, as set forth in claim 17, wherein energizing a puller is further defined as retracting a connector from at least one of the suspension knuckles and the tie rods in response to energizing the puller to disconnect the suspension knuckle from the respective tie rod if the moment of the vehicle about the longitudinal axis exceeds a threshold.

19. A method, as set forth in claim 16, further comprising:
   determining a direction of the moment of the vehicle about the longitudinal axis as being a moment in a first direction and a moment in a second direction, opposite the moment in the first direction, and
   disconnecting is further defined as disconnecting the first suspension knuckle from the first tie rod when the direction of the moment about the longitudinal axis is in the first direction and disconnecting the second suspension knuckle from the second tie rod when the direction of the moment of the vehicle about the longitudinal axis is in the second direction.

* * * * *